United States Patent
Lertora et al.

(10) Patent No.: US 8,035,512 B2
(45) Date of Patent: Oct. 11, 2011

(54) INTEGRATED SOLUTION FOR SENSOR INTERFACE FOR MONITORING THE ENVIRONMENTAL PARAMETERS BY MEANS OF RFID TECHNOLOGIES

(75) Inventors: Francesco Lertora, Chiavari (IT); Daniele Grosso, Genoa (IT); Giuseppe Oriana, Genoa (IT)

(73) Assignee: Montalbano Technology S.p.A., Pistoia (PT) (IT)

( * ) Notice: Subject to any disclaimer, the term of this patent is extended or adjusted under 35 U.S.C. 154(b) by 341 days.

(21) Appl. No.: 12/516,804

(22) PCT Filed: Nov. 29, 2007

(86) PCT No.: PCT/IT2007/000833
§ 371 (c)(1),
(2), (4) Date: May 29, 2009

(87) PCT Pub. No.: WO2008/065692
PCT Pub. Date: Jun. 5, 2008

(65) Prior Publication Data
US 2010/0060449 A1    Mar. 11, 2010

(30) Foreign Application Priority Data
Nov. 29, 2006   (IT) ............................. GE2006A0117

(51) Int. Cl.
*G08B 1/08* (2006.01)

(52) U.S. Cl. ............ 340/539.26; 340/572.1; 340/572.8; 340/10.1; 340/10.51; 340/12.51; 709/224

(58) Field of Classification Search ............... 340/12.51, 340/13.26, 14.61, 572.1, 572.8, 10.1, 539.26; 709/223–224, 14
See application file for complete search history.

(56) References Cited

U.S. PATENT DOCUMENTS

| | | | | |
|---|---|---|---|---|
| 4,853,901 A * | 8/1989 | Barber | ............................ | 367/27 |
| 5,488,376 A * | 1/1996 | Hurta et al. | ..................... | 342/42 |
| 6,046,676 A * | 4/2000 | Ward et al. | ................. | 340/572.1 |
| 6,720,866 B1 * | 4/2004 | Sorrells et al. | ............... | 340/10.4 |
| 6,778,096 B1 * | 8/2004 | Ward et al. | ........................ | 713/1 |
| 6,892,052 B2 * | 5/2005 | Kotola et al. | ................ | 455/41.2 |
| 7,072,697 B2 * | 7/2006 | Lappetelainen et al. | ...... | 455/574 |
| 7,106,175 B2 * | 9/2006 | Lewis | ........................ | 340/10.34 |
| 7,394,382 B2 * | 7/2008 | Nitzan et al. | ................ | 340/572.8 |
| 7,397,370 B2 * | 7/2008 | Bratkovski | ............... | 340/539.26 |
| 7,408,463 B2 * | 8/2008 | Hammond et al. | ......... | 340/572.1 |
| 7,446,658 B2 * | 11/2008 | Panotopoulos | ............ | 340/539.3 |
| 7,450,008 B2 * | 11/2008 | Erickson et al. | ........... | 340/572.1 |
| 7,474,230 B2 * | 1/2009 | Blom et al. | ............... | 340/870.04 |
| 7,495,558 B2 * | 2/2009 | Pope et al. | ................. | 340/572.1 |
| 7,873,723 B2 * | 1/2011 | Lyon et al. | ..................... | 709/224 |
| 2006/0103535 A1 * | 5/2006 | Pahlaven et al. | ........... | 340/572.1 |
| 2007/0139199 A1 * | 6/2007 | Hanlon | ...................... | 340/572.1 |

* cited by examiner

*Primary Examiner* — Daniel Wu
*Assistant Examiner* — Son M Tang
(74) *Attorney, Agent, or Firm* — Matthias Scholl, PC; Matthias Scholl

(57) ABSTRACT

Integrated device comprising: a microprocessor unit (1) which is interfaced to a program memory unit (2), a data memory unit (3), one or more integrated sensors (11), one or more external sensors (12) which may be either digitally or analogically interfaced, an RFID unit (7, 107), an RTC (Real Time Clock) synchronization module (5, 105) which can also control power supply means (13), said device further comprising a power supply and consumption management logic.

12 Claims, 3 Drawing Sheets

INTEGRATED SOLUTION FOR SENSOR INTERFACE FOR MONITORING THE ENVIRONMENTAL PARAMETERS BY MEANS OF RFID TECHNOLOGIES

The invention relates to integrated silicon devices ("System-on-Chip") and, particularly, it has been developed for applications in which it is necessary to interface electronic controllers to sensors for monitoring environmental parameters through a Radio Frequency IDentification (RFID) technology.

In order to provide a more and more complete and detailed "history" of products, it was some years that the logistics and commercial distribution market has been requiring increasingly sophisticated systems to monitor goods conditions. Now the development of electronic technologies allows to make integrated devices able to collect and/or process data gathered by various kinds of sensors provided with analog and/or digital interfaces, so as to achieve an exhaustive outline of the life of a given product, from its introduction on the market to its arrival to destination. This kind of devices have to take into account certain problems related to the control of power supply and power consumption, so as the operation of the device and sensors could be assured even for quite long periods of time.

Accordingly, the aim of the present invention is to provide a device able to variably adapt itself to the different requirements of the selected sensors, and to manage its own power supply in the best way.

Therefore, the object of the invention is an integrated device comprising: a microprocessor unit which is interfaced to a program memory unit, a data memory unit, one or more integrated sensors, one or more external sensors which may be provided with digital and/or analog interfaces, an RFID unit, such microprocessor unit being connected to an RTC (Real Time Clock) synchronization module and to power supply means, such device further comprising a power supply management logic.

In one preferred embodiment, the program memory unit is interfaced to the microprocessor unit through a multiplexer, which controls the alternating access to such program memory unit by either the microprocessor unit or the interface of the said RFID unit. Furthermore, the data memory unit is interfaced to the microprocessor unit and the RFID interface through an arbiter unit which regulates the access to such data memory unit.

In another preferred embodiment, the start ("boot") code of the microprocessor unit is contained in a ROM (Read Only Memory) memory unit.

Furthermore, the device has at least one integrated sensor, particularly a temperature sensor, which is provided with an appropriate interface to such microprocessor unit, and two different interfaces for the external sensors, i.e. an analog interface and a digital interface respectively. Preferably, the analog interface is of differential type, and the inputs thereof are provided with equalizer/adapter circuits such as, for example, operational amplifiers for connection of external analog sensors. The digital interface is of serial type, and a two-line serial interface is particularly preferred for data and synchronism, respectively.

Further advantages and features of the device according to the present invention will be appearent from the following description of an embodiment thereof, which is provided by way of illustration, and not by way of limitation, with reference to the accompanying drawings, wherein.

Figure 1:
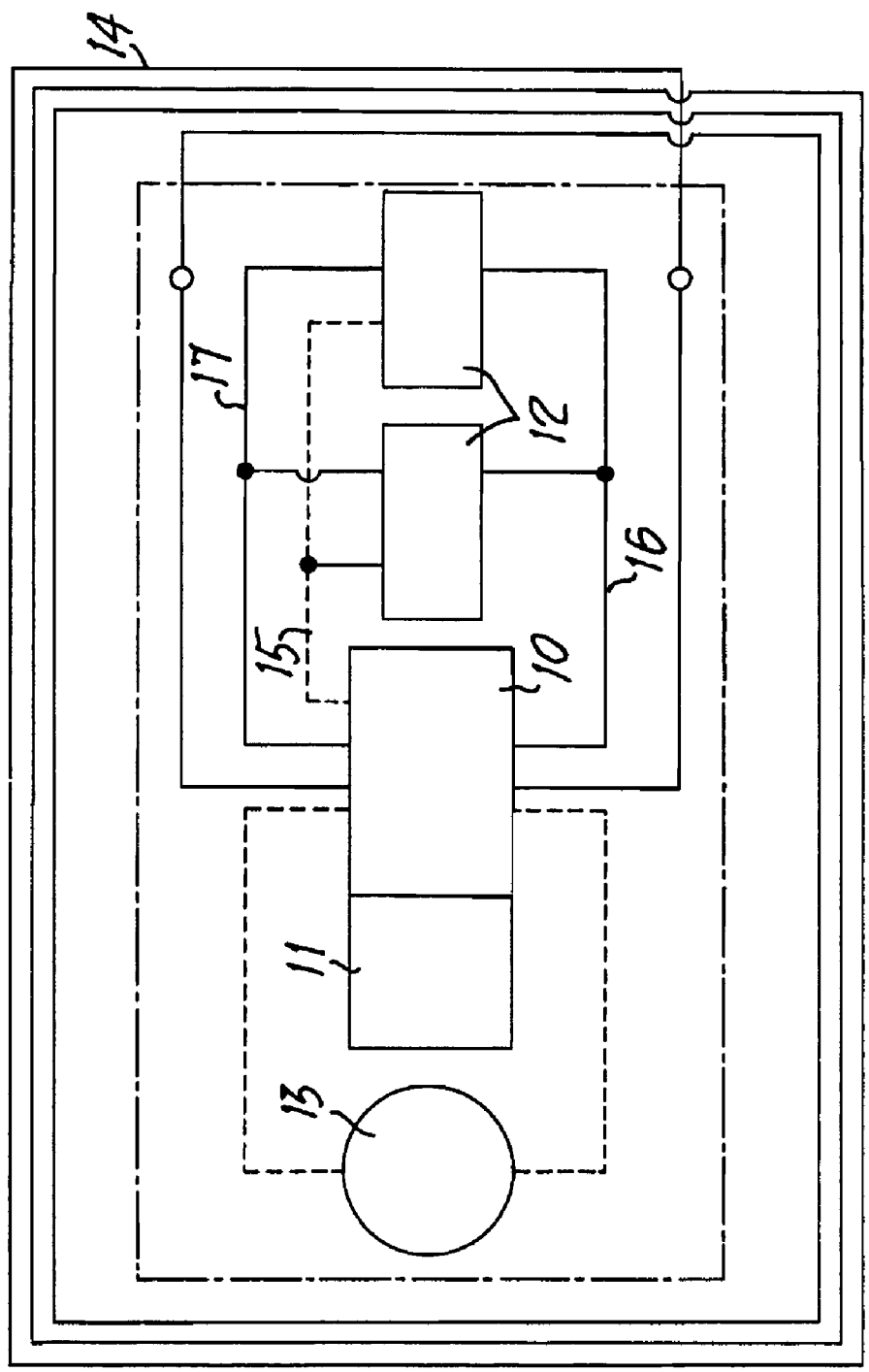
FIG. 1 is a schematic diagram of an apparatus comprising a device according to the present invention.

FIG. 1 illustrates an apparatus for detecting and transmitting environmental data and the like, comprising the device of the present invention; reference numeral 10 denotes the above mentioned integrated device, which is provided with at least one integrated sensor 11 and it is connected to a plurality of external sensors 12, a battery 13 and an antenna 14 whose coils surround the device. The sensors are connected to the device through a power supply line 15, data transfer line 16, and synchronization line 17.

Figure 2:
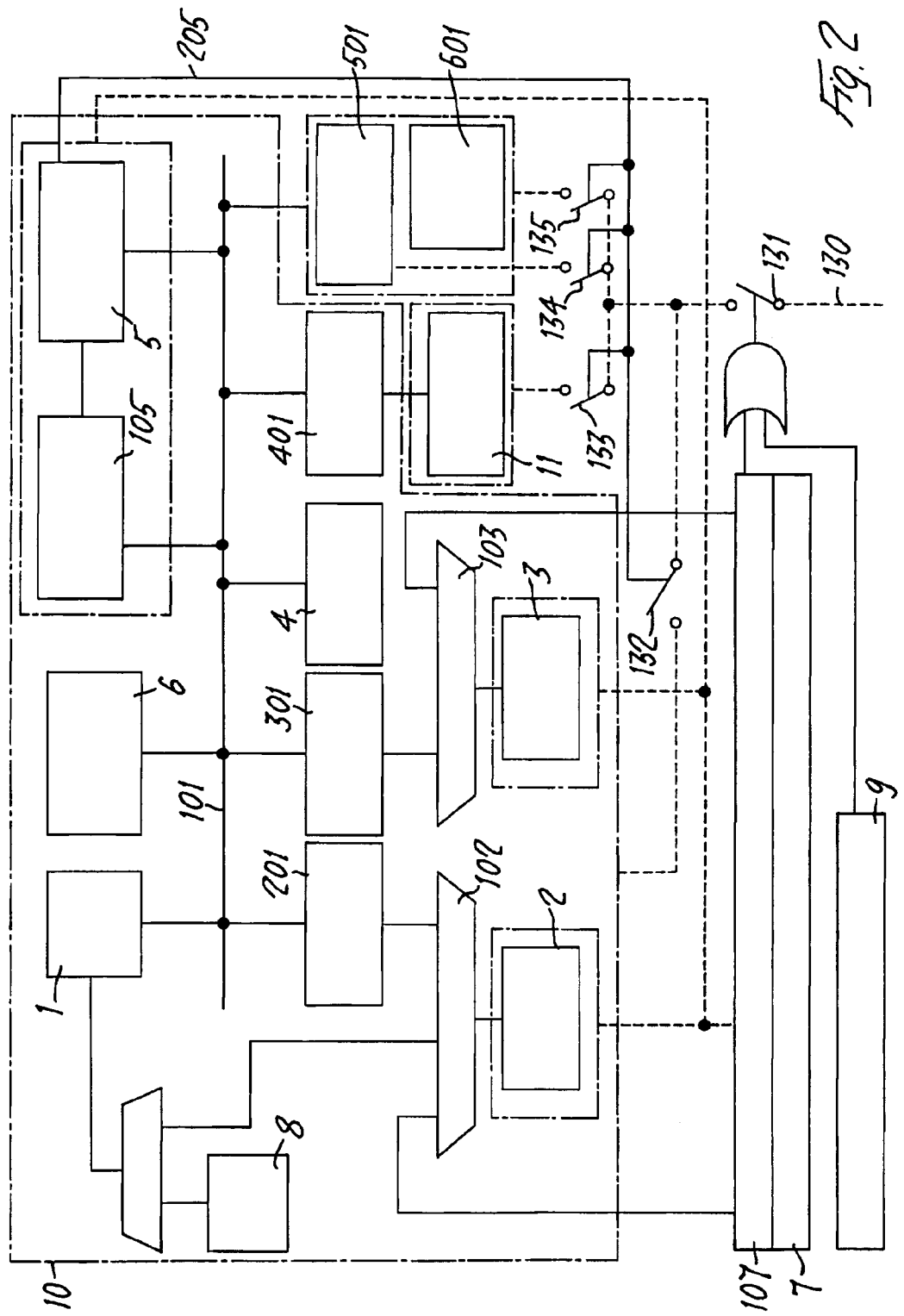
FIG. 2 is a schematic block diagram of the device according to the present invention.

FIG. 2 is a block diagram showing the device according to the present invention; reference numeral 1 denotes a microprocessor unit 1, which is connected to the other components of the device through a system bus 101. The microprocessor unit 1 communicates to a program memory unit 2 through an interface module 201; such program memory 2 is connected to an interface 201 through a multiplexer 102, to which an interface 107 of an RFID unit 7 is also connected. A data memory unit 3 is also shareable between an interface 301 connected to the microprocessor unit 1 and the interface 107 of the RFID unit 7, but in this case sharing occurs through an arbiter module 103.

The system bus 101 is also connected to a static RAM 4, which is used to process the data acquired by the sensors, the system bus 101 being also connected to interfaces 401 of integrated sensors 11 and interfaces 501, 601 of external sensors, not shown herein. The system bus 101 is connected to a synchronization module of an RTC system 5, which is coupled to a module 105 to keep synchronism only with the microprocessor 1. Such module 105 can also control switches 132, 133, 134, and 135 from a power supply line 130 through a line 205. The power supply line 130 is connected to the primary power source of the device and to batteries, except for a main switch 131 which is controlled only by the RFID unit 7 and a test logic module 9. In this way, the main power supply of the whole device (controlled by the main switch 131) is set by the user of the device itself through a suitable radio control. On the contrary, the local power supply of the various peripheral devices is set within the firmware contained in a non-volatile memory of the device, and therefore it has to be considered dependent on the final application. Finally, the microprocessor 1 is connected to a ROM unit 8 and a test/calibration module 6.

The operation of the device according to the present invention will become apparent from the following. The system can take the code and manage the data using the non-volatile memory resources 2 and 3. The program memory 2 is a resource multiplexed between the microprocessor and a radio interface; this means that only one of the two modules can exclusively access to the program memory 2 in a given time. On the other hand, the data memory 3 is arbitrated by the module 103; this means that both system bus 101 and radio interface 107 can simultaneously access to the data memory 3. If the data memory is occupied in a given time, the arbiter module 103 can put one of the two competitors in a wait state. A Read Only Memory (ROM) 8 stores the "boot" code of the microprocessor 1 to allow the whole system to behave as a completely autonomous RFID system. A time manager or "Real Time Clock" (RTC) module manages the synchronization within the device by generating "awake" events at programmable intervals which can act as a reference for the measurements carried out by the sensor. As illustrated in FIG. 2, the RTC module can selectively and programmably turn off/on most circuits of the integrated device so as to allow the final user to set a power consumption logic. The system is provided with an integrated main power switch 131 which can turn off/on the whole device, such main power switch 131 being controlled by an appropriate control generated by the radio interface 107. Furthermore, the system is provided with a circuit (not shown) to control the power supply voltage stability, which allows the connection to a power supply source such as standard-type batteries.

The device can provide the external sensors with power supply by incorporating a programmable power manager. The power supply can be provided to the sensors in continuous or alternating mode, depending on the logic selected for the power consumption of the whole device. A static RAM memory 4 is interfaced with the main bus to temporarily store the data processed by the microprocessor system. The whole system is provided with specific circuits, i.e. the test/calibration module 6 and the test logic module 9, to automatically test the interfaced modules on the main bus and the analog modules comprising the radio interface 107.

The device incorporates at least one sensor 11 (e.g., a temperature sensor) and two different interfaces to control external sensors. The analog interface 601 is of differential type and can be used for those sensors which need to adapt only the voltage or current level. Typically, these sensors will be provided with a signal equalizer/adapter circuit (e.g., based on an operational amplifier) which is directly connected to the differential inputs of such interface. The analog interface 601 is internally connected to an analog-digital conversion circuit which allows the voltage/current level measured by the external sensor to be converted into a 7-bit word which can be managed and processed by the microprocessor system, if desired.

The digital interface 501 is of serial type, typically a two-line interface, for data transmission and synchronization, and it allows the external connection of more complex sensors provided with their own control logic and programming ability (e.g., state and control registers). The digital interface 501 completely bypasses the analog-digital conversion circuit acting downstream the analog interface, and it is able to provide data from the external sensors directly to the microprocessor system. The digital interface can connect more sensors in a parallel fashion, such sensors differing from one another by a 7-bit logical address (the maximum theoretical number of connectable sensors is 128).

Figure 3:
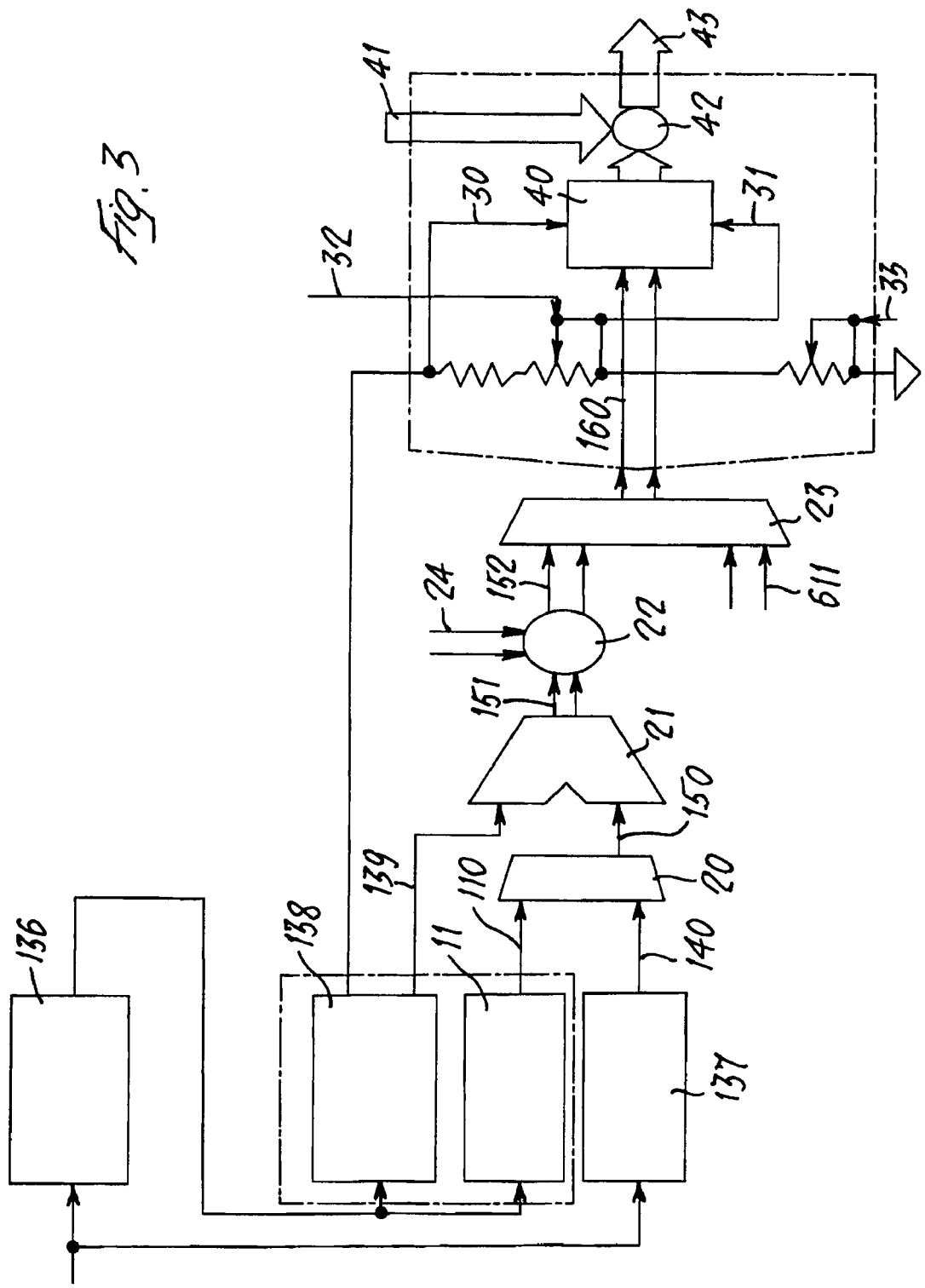
FIG. 3 is a schematic block diagram illustrating the operation of the analog-digital conversion chain which is incorporated in the device.

FIG. 3 illustrates the operation of an analog-digital conversion chain which is incorporated in a preferred embodiment of the device. The power supply from the battery 13 is normalized by a voltage regulator 136 which powers both a module 138 supplying the reference voltage for all measurement circuits, and the integrated sensor 11, i.e. the temperature sensor. The reference voltage 139 is obtained by further normalizing the voltage from the regulator 136 against possible changes due to temperature. On the other hand, the signal 110 from the sensor 11 is multiplexed with the signal 140 from the monitor 137 of the power supply battery 13 in the multiplexer 20, which is driven by the control logic. The two signals 139 and 150 are now compared in a module 21 to obtain a differential signal 151 which is amplified in a module 22 by introducing a programmable input gain factor 24 which allows the amplification by multiplying the signal by a factor 2, 4, 8, or 16.

The amplified differential signal 152 is then sent to a multiplexer 23 which starts the effective conversion thereof along with differential signal 611 from the analog interface 601. The differential signal 160 is then sent to an analog-digital converter 40. The voltage references, VH 30 and VL 31, of the analog-digital converter 40 can be controlled by a gain factor 32 (A2D Gain), while the common mode of the differential input thereof can be controlled by an offset parameter 33 (A2D Common Mode), the voltage references, VH 30 and VL 31, being used for the conversion. In practice, this functionality can be generally modeled by an equation as:

$$A2D_{out} = (V_{Differential\ input} - A2D_{Common\ Mode}) / A2D_{Gain}.$$

The higher the parameter A2D Gain, the higher the accepted voltage entering from the analog-digital conversion circuit, and therefore the lower the converted value for the same input. Instead, the parameter A2D Common Mode acts as an offset element which theoretically cancels the output of the analog-digital converter for a well known input voltage. A simple digital adder 42 has been added to the output of the analog-digital converter to further control the offset of the whole chain through the value A2D Offset 41. Finally, the output 43 of the converter is represented by a 7-bit word which can be further processed by the programs within the system.

The invention claimed is:

1. Integrated device comprising: a microprocessor unit (1) which is interfaced to a program memory unit (2), a data memory unit (3), one or more integrated sensors (11), one or more external sensors (12) which may be either digitally or analogically interfaced, an RFID unit (7, 107), an RTC (Real Time Clock) synchronization module (5, 105) which can also control power supply means (13), said device further comprising a power supply management logic, wherein the program memory unit (2) is interfaced to the microprocessor unit through a multiplexer (102), which controls the alternating access to said program memory unit (2) by either said microprocessor unit (1) or an interface (107) of the RFID unit (7).

2. Device according to claim 1, wherein the data memory unit (3) is interfaced to the microprocessor unit (1) and the RFID interface (107) through an arbiter unit (103) which regulates the access to said data memory unit (3).

3. Device according to any one of claims 1 to 2, wherein a start ("boot") code of the microprocessor unit (1) is contained in a ROM (Read Only Memory) memory unit (8).

4. Device according to any one of claims 1 to 3, wherein at least one integrated sensor (11) is provided, said at least one integrated sensor (11) comprising an appropriate interface to said microprocessor unit (1).

5. Device according to claim 4, wherein said integrated sensor (11) is a temperature sensor.

6. Device according to any one of preceding claims, wherein two different interfaces (501, 601) are provided for the external sensors, said interfaces being an analog interface (601) and a digital interface (501) respectively.

7. Device according to claim 6, wherein the analog interface is of differential type, the inputs of said analog interface being provided with equalizer/adapter circuits for connection of external analog sensors (12).

8. Device according to claim 7, wherein said equalizer/adapter circuits comprise operational amplifiers.

9. Device according to claim 7 or claim 8, wherein said analog interface is connected to an analog-digital conversion circuit comprising: an analog-digital converter (40) wherein high voltage VH (30) and low voltage VL (31) references are controlled by a gain factor (32), the common mode of the differential input being controlled by an offset parameter (33).

10. Device according to claim 9, wherein a multiplexer (23) is inserted upstream the converter (40) to discriminate between the signal (152) from the integrated sensors (11) and the differential signal (611) from the analog interface (601).

11. Device according to any one of claim 9 or 10, wherein the voltage reference for all measurement circuits is provided by a specific module (138).

12. Device according to any one of claims 1 to 11, wherein the digital interface (501) is of serial type, and a two-line serial interface is particularly preferred for data and synchronism respectively.

* * * * *